United States Patent
Wang et al.

(10) Patent No.: US 8,900,833 B2
(45) Date of Patent: Dec. 2, 2014

(54) METHOD OF RECOVERING LIPIDS FROM MICROBIAL BIOMASS

(71) Applicant: Shell Oil Company, Houston, TX (US)

(72) Inventors: Pen-Chung Wang, Houston, TX (US); Joseph James Alishusky, Houston, TX (US); Robert Lawrence Blackbourn, Houston, TX (US); Paul Richard Weider, Houston, TX (US)

(73) Assignee: Shell Oil Company, Houston, TX (US)

( * ) Notice: Subject to any disclaimer, the term of this patent is extended or adjusted under 35 U.S.C. 154(b) by 185 days.

(21) Appl. No.: 13/687,806

(22) Filed: Nov. 28, 2012

(65) Prior Publication Data

US 2013/0144078 A1 Jun. 6, 2013

Related U.S. Application Data

(60) Provisional application No. 61/565,554, filed on Dec. 1, 2011.

(51) Int. Cl.
| | | |
|---|---|---|
| *C11B 1/02* | (2006.01) | |
| *C11B 1/10* | (2006.01) | |
| *C11B 11/00* | (2006.01) | |
| *A23D 9/02* | (2006.01) | |

(52) U.S. Cl.
CPC . *C11B 11/00* (2013.01); *A23D 9/02* (2013.01); *C11B 1/02* (2013.01); *C11B 1/10* (2013.01)
USPC .......................................................... 435/134

(58) Field of Classification Search
CPC .............. C11B 1/02; C11B 1/10; C11B 11/00
See application file for complete search history.

(56) References Cited

U.S. PATENT DOCUMENTS

| | | | |
|---|---|---|---|
| 2,115,380 A | 4/1938 | Adams et al. | |
| 3,549,319 A | 12/1970 | Wilson et al. | |
| 2007/0003686 A1 | 1/2007 | Fichtali et al. | |
| 2012/0122152 A1* | 5/2012 | Blackbourn et al. | ............ 435/41 |

FOREIGN PATENT DOCUMENTS

EP 2251412 11/2010

OTHER PUBLICATIONS

Ingledew, W.M. et al.; "Fast Pyrolysis and Bio-oil Upgrading"; Pacific Northwest National Laboratory, Richland, Washington; Sep. 5-6, 2006.
International Search Report from corresponding PCT/US2012/066838 dated Mar. 5, 2013; 4 pages.

* cited by examiner

*Primary Examiner* — Jon P Weber
*Assistant Examiner* — Charles Zoltan Constantine

(57) ABSTRACT

A method of obtaining lipids from microbial biomass such as algae is provided by treating microbial biomass with a solution containing at least one α-hydroxysulfonic acid to extract and recover liposoluble components. The α-hydroxysulfonic acid can be easily removed from the product containing liposoluble components and recycled.

17 Claims, 1 Drawing Sheet

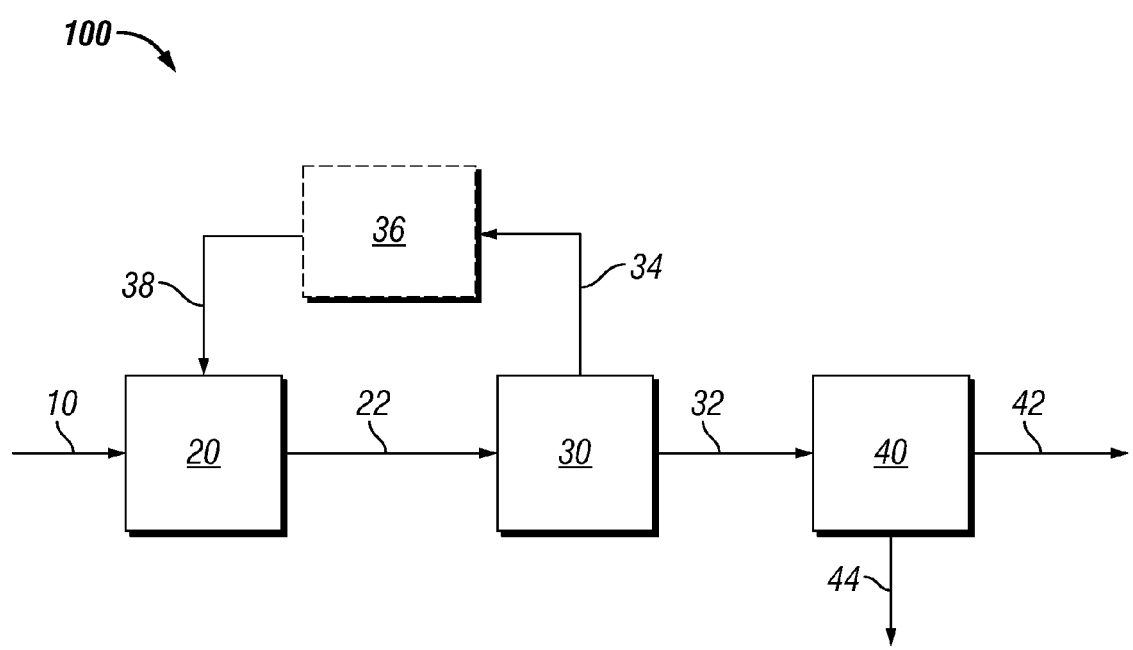

METHOD OF RECOVERING LIPIDS FROM MICROBIAL BIOMASS

The present application claims the benefit of U.S. Provisional Patent Application Ser. No. 61/565,554, filed Dec. 1, 2011, the entire disclosure of which is hereby incorporated by reference.

FIELD OF THE INVENTION

The invention relates to a process for recovering lipids from microbial biomass.

BACKGROUND OF THE INVENTION

Microorganisms such as fungi, yeast, bacteria, and algae have ability to produce lipids. Lipids constitute a broad group of naturally occurring molecules that include fats, waxes, sterols, fat-soluble vitamins (such as vitamins A, D, E, and K), monoglycerides, diglycerides, triglycerides, phospholipids, and others. The main biological functions of lipids include energy storage, as structural components of cell membranes, and as important signaling molecules.

Lipid is generally accumulated in microbial cell. Therefor, there have been practiced a variety of methods to extract lipids from microbial cells endowed with lipid-producing ability. To release lipids from source material, it might be necessary to destruct cell walls prior to lipid extraction. The disruption may occur physically, enzymatically and/or chemically. Preferably, cell disruption is performed by mechanical means. Several methods have been used for the physical disruption of cells, including homogenization, sonication, freeze/thaw, extrusion, and mechanical grinding. However, these methods require quite a long time to recover a sufficient amount of lipids and therefore, efficient extraction cannot be performed. For example, homogenizayion of wet microbial biomass may create emulsions which make the subsequent extraction step difficult.

SUMMARY OF THE INVENTION

In an embodiment, a method of producing lipids is provided comprising: (a) providing a microbial biomass; (b) contacting the microbial biomass with a solution containing at least one α-hydroxysulfonic acid thereby producing acid-treated biomass; and (c) extracting lipids from the acid-treated biomass.

In yet another embodiment, a method of producing lipids is provided comprising: (a) providing a microbial biomass; (b) contacting the microbial biomass with a solution containing at least one α-hydroxysulfonic acid thereby producing acid-treated biomass; (c) extracting lipids from the acid-treated biomass; and (d) removing the α-hydroxysulfonic acid in its component form from the acid-treated biomass by heating and/or reducing pressure to produce an acid-removed product containing acid-treated biomass substantially free of the α-hydroxysulfonic acid.

In another embodiment, a method comprises recycling the removed α-hydroxysulfonic acid to step (b) as components or in its recombined form.

The features and advantages of the invention will be apparent to those skilled in the art. While numerous changes may be made by those skilled in the art, such changes are within the spirit of the invention.

BRIEF DESCRIPTION OF THE DRAWING

This drawing illustrates certain aspects of some of the embodiments of the invention, and should not be used to limit or define the invention.

The FIGURE schematically illustrates a block flow diagram of an embodiment of the treatment process of this invention.

DETAILED DESCRIPTION OF THE INVENTION

It has been found that the destruction of microbial cells by use of α-hydroxysulfonic acid remarkably increase permeability of a solvent to the cells and the extraction efficiency of the lipids contained in the microbial cells. The α-hydroxysulfonic acid is effective for destruction of microbial cell walls improving the recovery of lipids from the microbial biomass. Further, the α-hydroxysulfonic acid is reversible to readily removable and recyclable materials nor form emulsions such as by homogenization at high pressure.

Microorganisms containing lipids in the microbial cells like microbial biomass can be treated by the present process. Microbial biomass may be grown photosynthetically or by fermentation. Microbial biomass may include, for example, microalgae, yeast, fungi or bacteria.

The alpha-hydroxysulfonic acids of the general formula

where $R_1$ and $R_2$ are individually hydrogen or hydrocarbyl with up to about 9 carbon atoms that may or may not contain oxygen can be used in the treatment of the instant invention. The alpha-hydroxysulfonic acid can be a mixture of the aforementioned acids. The acid can generally be prepared by reacting at least one carbonyl compound or precursor of carbonyl compound (e.g., trioxane and paraformaldehyde) with sulfur dioxide or precursor of sulfur dioxide (e.g., sulfur and oxidant, or sulfur trioxide and reducing agent) and water according to the following general equation 1.

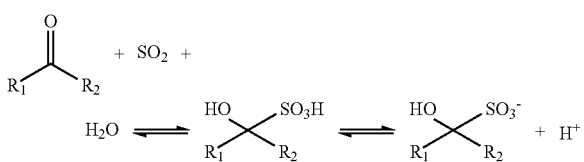

where $R_1$ and $R_2$ are individually hydrogen or hydrocarbyl with up to about 9 carbon atoms or a mixture thereof.

Illustrative examples of carbonyl compounds useful to prepare the alpha-hydroxysulfonic acids used in this invention are found where
$R_1=R_2=H$ (formaldehyde)
$R_1=H, R_2=CH_3$ (acetaldehyde)
$R_1=H, R_2=CH_2CH_3$ (propionaldehyde)
$R_1=H, R_2=CH_2CH_2CH_3$ (n-butyraldehyde)$R_1=H, R_2=CH(CH_3)_2$ (i-butyraldehyde)
$R_1=H, R_2=CH_2OH$ (glycolaldehyde)
$R_1=H, R_2=CHOHCH_2OH$ (glyceraldehdye)
$R_1=H, R_2=C(=O)H$ (glyoxal)

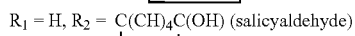

-continued

R₁ = H, R₂ = C(CH)₄CH (benzaldehyde)

R₁=R₂=CH₃ (acetone)
R₁=CH₂OH, R₂=CH₃ (acetol)
R₁=CH₃, R₂=CH₂CH₃ (methyl ethyl ketone)
R₁=CH₃, R₂=CHC(CH₃)₂ (mesityl oxide)
R₁=CH₃, R₂=CH₂CH(CH₃)₂ (methyl i-butyl ketone)
R₁, R₂=(CH₂)₅ (cyclohexanone) or
R₁=CH₃, R₂=CH₂Cl (chloroacetone)

The carbonyl compounds and its precursors can be a mixture of compounds described above. For example, the mixture can be a carbonyl compound or a precursor such as, for example, trioxane which is known to thermally revert to formaldehyde at elevated temperatures or an alcohol that maybe converted to the aldehyde by dehydrogenation of the alcohol to an aldehyde by any known methods. An example of such a conversion to aldehyde from alcohol is described below. An example of a source of carbonyl compounds maybe a mixture of hydroxyacetaldehyde and other aldehydes and ketones produced from fast pyrolysis oil such as described in "Fast Pyrolysis and Bio-oil Upgrading, Biomass-to-Diesel Workshop", Pacific Northwest National Laboratory, Richland, Wash., Sep. 5-6, 2006. The carbonyl compounds and its precursors can also be a mixture of ketones and/or aldehydes with or without alcohols that may be converted to ketones and/or aldehydes, preferably in the range of 1 to 7 carbon atoms.

The preparation of α-hydroxysulfonic acids by the combination of an organic carbonyl compounds, SO₂ and water is a general reaction and is illustrated in equation 2 for acetone.

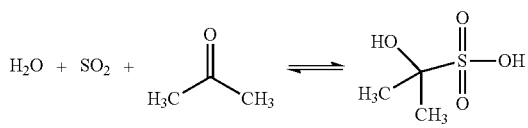

The α-hydroxysulfonic acids appear to be as strong as, if not stronger than, HCl since an aqueous solution of the adduct has been reported to react with NaCl freeing the weaker acid, HCl (see U.S. Pat. No. 3,549,319). The reaction in equation 1 is a true equilibrium, which results in facile reversibility of the acid. That is, when heated, the equilibrium shifts towards the starting carbonyl, sulfur dioxide, and water (component form). If the volatile components (e.g. sulfur dioxide) is allowed to depart the reaction mixture via vaporization or other methods, the acid reaction completely reverses and the solution becomes effectively neutral. Thus, by increasing the temperature and/or lowering the pressure, the sulfur dioxide can be driven off and the reaction completely reverses due to Le Châtelier's principle, the fate of the carbonyl compound is dependant upon the nature of the material employed. If the carbonyl is also volatile (e.g. acetaldehyde), this material is also easily removed in the vapor phase. Carbonyl compounds such as benzaldehyde, which are sparingly soluble in water, can form a second organic phase and be separated by mechanical means. Thus, the carbonyl can be removed by conventional means, e.g., continued application of heat and/or vacuum, steam and nitrogen stripping, solvent washing, centrifugation, etc. Therefore, the formation of these acids is reversible in that as the temperature is raised, the sulfur dioxide and/or aldehyde and/or ketone can be flashed from the mixture and condensed or absorbed elsewhere in order to be recycled. It has been found that these reversible acids, which are approximately as strong as strong mineral acids, are effective in disrupting cells of microorganisms. We have found that these treatment increase permeability of a solvent to the cells and the extraction efficiency of the lipids, thus increasing lipid recovery. Additionally, since the acids are effectively removed from the reaction mixture following treatment, neutralization with base to complicate downstream processing is substantially avoided. The ability to reverse and recycle these acids also allows the use of higher concentrations than would otherwise be economically or environmentally practical.

It has been found that the position of the equilibrium given in equation 1 at any given temperature and pressure is highly influenced by the nature of the carbonyl compound employed, steric and electronic effects having a strong influence on the thermal stability of the acid. More steric bulk around the carbonyl tending to favor a lower thermal stability of the acid form. Thus, one can tune the strength of the acid and the temperature of facile decomposition by the selection of the appropriate carbonyl compound.

In some embodiments, the reactions described below are carried out in any system of suitable design, including systems comprising continuous-flow (such as CSTR and plug flow reactors), batch, semi-batch or multi-system vessels and reactors and packed-bed flow-through reactors. For reasons strictly of economic viability, it is preferable that the invention is practiced using a continuous-flow system at steady-state equilibrium.

The FIGURE shows an embodiment of the present invention 100 for recovering lipids from microbial biomass. In this embodiment, microbial biomass 10 is introduced into an acid treatment system 20 containing α-hydroxysulfonic acid where the microbial biomass is allowed to contact with a solution containing at least one α-hydroxysulfonic acid thereby producing acid-treated biomass 22. The acid treatment system may comprise a number of components including in situ generated α-hydroxysulfonic acid. The term "in situ" as used herein refers to a component that is produced within the overall process; it is not limited to a particular reactor for production or use and is therefore synonymous with an in process generated component. The acid treated biomass 22 from 20 is introduced to acid removal system 30 where the acid is removed in its component form 34 then is recovered (and optionally scrubbed 36) and recycled (as components or in its recombined form) via recycle stream 38 to 20 and the acid treated biomass product stream 32 containing the acid treated biomass substantially free of the alpha-hydroxysulfonic acids is provided to the lipid extraction zone 40 where lipid is extracted and recovered 42 from the extracted biomass 44. In the recycling of the removed acid, optionally additional carbonyl compounds, SO2, and water may be added as necessary (collectively 38). The removed acid as components may be recycled to 38 as components and/or in its recombined form (as α-hydroxysulfonic acid).

Thus, a typical acid treatment mixture contains (a) a microbial biomass containing at least one lipid, (b) at least one α-hydroxysulfonic acid, and (c) water.

Lipids can be extracted through a wide variety of known methods. The extraction may be physical extraction or chemical extraction. In a physical extraction, the microbial biomass is dried then the lipids can be pressed out with an oil press (with optional mechanical crushing). Various press configurations such as screw, expeller, and piston may be used. The mechanical crushing may be used alone or in conjunction with chemical solvent extraction. A common choice of solvent for chemical solvent extraction is hexane, which is widely used in industry. Benzene and ether can also be used to separate the lipids. Many other solvents can also be used. Another method of chemical solvent extraction is Soxhlet extraction. In this method, lipids from the microbe are extracted through repeated washing, or percolation with an organic solvent such as hexane or petroleum ether under reflux in a special glassware. The solvent is reused for each cycle. Supercritical $CO_2$ may also be used as a solvent. In this method, $CO_2$ is liquefied under pressure and heated to the point that it becomes supercritical (having properties of both a liquid and a gas), allowing it to act as a solvent. Lipids can also be removed from the algae by chemically altering the lipids, for example by hydrolysis and esterification/transesterification to fatty acid methyl esters (FAME) and phase separating the resulting material.

Various factors affect the cell disruption of the microbial biomass. The carbonyl compound or incipient carbonyl compound (such as trioxane) with sulfur dioxide and water should be added to in an amount and under conditions effective to form alpha-hydroxysulfonic acids. The temperature and pressure of the acid treatment should be in the range to form alpha-hydroxysulfonic acids and to disrupt the microbial biomass cells. The amount of carbonyl compound or its precursor and sulfur dioxide should be to produce alpha-hydroxysulfonic acids in the range from about 1 wt %, preferably from about 5 wt %, most preferably from about 10 wt %, to about 55 wt %, preferably to about 50 wt %, more preferably to about 40 wt %, based on the total solution. For the reaction, excess sulfur dioxide is not necessary, but any excess sulfur dioxide may be used to drive the equilibrium in eq. 1 to favor the acid form at elevated temperatures. The contacting conditions of the hydrolysis reaction may be conducted at temperatures preferably at least from about 50° C. depending on the alpha-hydroxysulfonic acid used, although such temperature may be as low as room temperature depending on the acid and the pressure used. The contacting condition of the hydrolysis reaction may range preferably up to and including about 150° C. depending on the alpha-hydroxysulfonic acid used. In a more preferred condition the temperature is at least from about 80° C., most preferably at least about 100° C. In a more preferred condition the temperature range up to and including about 90° C. to about 120° C. The reaction is preferably conducted at as low a pressure as possible, given the requirement of containing the excess sulfur dioxide. The reaction may also be conducted at a pressure as low as about 1 barg, preferably about 4 barg, to about pressure of as high as up to 10 barg The temperature and pressure to be optimally utilized will depend on the particular alpha-hydroxysulfonic acid chosen and optimized based on economic considerations of metallurgy and containment vessels as practiced by those skilled in the art.

The temperature of the acid treatment can be chosen so that the maximum amount of extractable lipids from the microbial biomass is extracted while limiting the formation of degradation products. The amount of acid solution to "dry weight" biomass determines the ultimate concentration of lipids obtained. Thus, as high a biomass concentration as possible is desirable.

In some embodiments, a plurality of vessels may be used to carry out the acid treatment. These vessels may have any design capable of carrying out a acid treatment. Suitable vessel designs can include, but are not limited to, batch, trickle bed, co-current, counter-current, stirred tank, or fluidized bed reactors. Staging of reactors can be employed to arrive the most economical solution. Suitable reactor designs can include, but are not limited to, a backmixed reactor (e.g., a stirred tank, a bubble column, and/or a jet mixed reactor) may be employed if the viscosity and characteristics of the partially digested bio-based feedstock and liquid reaction media is sufficient to operate in a regime where bio-based feedstock solids are suspended in an excess liquid phase (as opposed to a stacked pile digester). It is also conceivable that a trickle bed reactor could be employed with the microbial biomass present as the stationary phase and a solution of α-hydroxysulfonic acid passing over the material.

The residual alpha-hydroxysulphonic acid can be removed by application of heat and/or vacuum from the acid treated biomass to reverse the formation of alpha-hydroxysulphonic acid to its starting material to produce a stream containing the acid-treated biomass substantially free of the α-hydroxysulfonic acid. In particular, the product stream is substantially free of alpha-hydroxysulphonic acid, meaning no more than about 2 wt % is present in the product stream, preferably no more than about 1 wt %, more preferably no more than about 0.2 wt %, most preferably no more than about 0.1 wt % present in the product stream. The temperature and pressure will depend on the particular alpha-hydroxysulphonic acid used and minimization of temperatures employed are desirable to preserve the sugars obtain in treatment reactions. Typically the removal may be conducted at temperatures in the range from about 50° C., preferably from about 80° C., more preferably from 90° C., to about 110° C., up to about 150° C. The pressure in the range of from about 0.1 bara to about 3 bara, more preferably from 1 bara (atmospheric) to about 2 bara. It can be appreciated by a person skill in the art that the treatment reaction 20 and the removal of the acid 30 can occurred in the same vessel or a different vessel or in a number of different types of vessels depending on the reactor configuration and staging as long as the system is designed so that the reaction is conducted under condition favorable for the formation and maintenance of the alpha-hydroxysulfonic acid and removal favorable for the reverse reaction. As an example, the reaction in the reactor vessel 20 can be operated at approximately 100° C. and a pressure of 4 barg in the presence of alpha-hydroxyethanesulfonic acid and the removal vessel 30 can be operated at approximately 110° C. and a pressure of 0.5 barg. It is further contemplated that the reversion can be favored by the reactive distillation of the formed alpha-hydroxysulfonic acid. In the recycling of the removed acid, optionally additional carbonyl compounds, $SO_2$, and water may be added as necessary.

While the invention is susceptible to various modifications and alternative forms, specific embodiments thereof are shown by way of examples herein described in detail. It should be understood, that the detailed description thereto are not intended to limit the invention to the particular form disclosed, but on the contrary, the intention is to cover all modifications, equivalents and alternatives falling within the spirit and scope of the present invention as defined by the appended claims. The present invention will be illustrated by the following illustrative embodiment, which is provided for illustration only and is not to be construed as limiting the claimed invention in any way.

ILLUSTRATIVE EMBODIMENTS

General Methods and Materials

In the examples, the aldehyde or aldehyde precursors were obtained from Sigma-Aldrich Co.

Commercial microalge products obtained from Reed Mariculture Inc. were used to perform the experiments (*Nannochloropsis* green algae).

Analytical Methods

Lipid Determination for Bulk Algae Material:

The determination of the total lipid content was carried out by using the Dinoex Solvent Extractor (ASE 350). The algae sample was freeze dried over night. Then filled a extractor cell (66 ml) with one gram of algale sample along with sand. Two glass fiber filters (0.2 microns) at both ends of the ASE extractor cell in order to block any potential algae slippage to the extracted solvents. A mixture of methanol and chloroform (65%:35%) was used a solvent system to extract the lipids in 10 min static time at 60° C. under 1500 psi pressure. After the ASE extraction, any salts in the extract were washed out in a separatory funnel by shaking with deionized water. Separated chloroform/methanol solvents were evaporated to dryness in Genevac centrifugal evaporator. Lipid content was calculated after weighting the dry lipids using an analytical balance.

The lipid content is reported as Lipid=(sample extract weight−blank extract weight)/dry weight.

EXAMPLES

General Procedure for the Formation of α-Hydroxysulfonic Acids

Aldehydes and ketones will readily react with sulfur dioxide in water to form α-hydroxy sulfonic acids according to the equation 1 above. These reactions are generally rapid and somewhat exothermic. The order of addition ($SO_2$ to carbonyl or carbonyl to $SO_2$) did not seem to affect the outcome of the reaction. If the carbonyl is capable of aldol reactions, preparation of concentrated mixtures (>30% wt.) are best conducted at temperatures below ambient to minimize side reactions. We have found it beneficial to track the course of the reaction using in situ Infrared Spectroscopy (ISIR) employing probes capable of being inserted into pressure reaction vessels or systems. There are numerous manufacturers of such systems such as Mettler Toledo Autochem's Sentinal probe. In addition to being able to see the starting materials: water (1640 $cm^{-1}$), carbonyl (from approx. 1750 $cm^{-1}$ to 1650 $cm^{-1}$ depending on the organic carbonyl structure) and $SO_2$ (1331 $cm^{-1}$), the formation of the α-hydroxysulfonic acid is accompanied by the formation of characteristic bands of the $SO_3^-$ group (broad band around 1200 $cm^{-1}$) and the stretches of the α-hydroxy group (single to multiple bands around 1125 $cm^{-1}$). In addition to monitoring the formation of the α-hydroxy sulfonic acid, the relative position of the equilibrium at any temperature and pressure can be readily assessed by the relative peak heights of the starting components and the acid complex. The definitive presence of the α-hydroxy sulfonic acid can also be confirmed with the ISIR.

Example 1

Formation of 40% Wt. α-Hydroxyethane Sulfonic Acid from Acetaldehyde

Into a 12 ounce Lab-Crest Pressure Reaction Vessel (Fischer-Porter bottle) was placed 260 grams of nitrogen degassed water. To this was added 56.4 grams of acetaldehyde via syringe with stiffing. The acetaldehyde/water mixture showed no apparent vapor pressure. The contents of the Fischer-Porter bottle were transferred into a chilled 600 ml C276 steel reactor fitted with SiComp IR optics. A single ended Hoke vessel was charged with 81.9 grams of sulfur dioxide was inverted and connected to the top of the reactor. The $SO_2$ was added to the reaction system in a single portion. The pressure in the reactor spiked to approximately 3 bar and then rapidly dropped to atmospheric pressure as the ISIR indicated the appearance and then rapid consumption of the $SO_2$. The temperature of the reaction mixture rose approximately 31° C. during the formation of the acid (from 14° C. to 45° C.). ISIR and reaction pressure indicated the reaction was complete in approximately 10 minutes. The final solution showed an infrared spectrum with the following characteristics: a broad band centered about 1175 $cm^{-1}$ and two sharp bands at 1038 $cm^{-1}$ and 1015 $cm^{-1}$. The reactor was purged twice by pressurization with nitrogen to 3 bar and then venting. This produced 397 grams of a stable solution of 40% wt. α-hydroxyethane sulfonic acid with no residual acetaldehyde or $SO_2$. A sample of this material was dissolved in $d_6$-DMSO and analyzed by $^{13}C$ NMR, this revealed two carbon absorbances at 81.4, and 18.9 ppm corresponding the two carbons of α-hydroxyethane sulfonic acid with no other organic impurities to the limit of detection (about 800:1).

Examples 2

Microalgae Treatment with α-Hydroxyethane Sulfonic Acid Solutions

Into a 300 ml autoclave equipped with a DiComp IR probe approximately 100 grams wet *Nannochloropsis* green algae (water content 81.60%) was placed. To this added approximately 6.16 grams of acetaldehyde with stirring. A single ended Hoke vessel charged with approximately 10.0 grams of sulfur dioxide was inverted and connected to the top of the reactor. The $SO_2$ was added to the reaction system in a single portion. The reactor now contains a mixture comprising approximately 16% wt. green algae in contact with α-hydroxy sulfonic acid solution (17.64 grams total α-hydroxy sulfonic acid).

The reaction mixture is stirred (1000 to 1500 rpm as noted in column I using a 45° downpitch impeller) and begin acquisition of IR spectra. The reaction mixture is then heated to the target temperature of 100° C. and held for a period of one hour. The heating is discontinued and the reactor cooled to room temperature using a flow of compressed air. The reactor was vented and then purged with a slow nitrogen stream for a few minutes to eliminate any sulfur dioxide in the gas cap. The reactor was opened and the contents filtered through a medium glass frit funnel using a vacuum aspirator. The reactor was rinsed with three separate 25 ml portions of water (noting weight on all rinses), the rinses being used to complete the transfer of solids and rinse the solids in the funnel. In order to completely rinse the solids in the funnel, it was necessary to turn off the vacuum, add the water, suspend the solids by manual agitation and then reestablish the vacuum to filter. The cumulative weight of the filtrate and rinses was obtained. The filtrate was dried then extracted with hexane to recover the lipids by Soxhlet extraction. 20.22% of the lipid based on the dry weight were recovered after acid pretreatment, drying and extraction compared to 3.06% for untreated materials. An untreated sample was also submitted to analytical lab to determine the lipid content. Using ASE (accelerated solvent extraction) method and hexane as a solvent, only 12.7% of the lipid was recovered. All 3 samples of the extracted lipids showed the same composition determined by C13 NMR.

What is claimed is:

1. A method of producing lipids comprising: (a) providing a microbial biomass; (b) contacting the microbial biomass with a solution containing at least one α-hydroxysulfonic acid thereby producing acid-treated biomass; and (c) extracting lipids from the acid-treated biomass.

2. The method of claim 1 further comprising (d) removing the α-hydroxysulfonic acid in its component form from the acid-treated biomass by heating and/or reducing pressure to produce an acid-removed product containing acid-treated biomass substantially free of the α-hydroxysulfonic acid.

3. The method of claim 2 further comprising recycling the removed α-hydroxysulfonic acid to step (b) as components or in its recombined form.

4. The method of claim 2 wherein the α-hydroxysulfonic acid is present in an amount of from about 1% wt. to about 55% wt., based on the solution.

5. The method of claim 2 wherein the α-hydroxysulfonic acid is produced from (a) a carbonyl compound or a precursor to a carbonyl compound with (b) sulfur dioxide or a precursor to sulfur dioxide and (c) water.

6. The method of claim 5 further comprising recycling the removed α-hydroxysulfonic acid to step (b) as components or in its recombined form.

7. The method of claim 2 wherein the α-hydroxysulfonic acid is in-situ generated.

8. The method of claim 7 further comprising recycling the removed α-hydroxysulfonic acid to step (b) as components or in its recombined form.

9. The method of claim 2 wherein step (b) is carried out at a temperature within the range of about 50° C. to about 150° C. and a pressure within the range of 1 barg to about 10 barg.

10. The method of claim 9 further comprising recycling the removed α-hydroxysulfonic acid to step (b) as components or in its recombined form.

11. The method of claim 2 wherein at least a portion the lipid is further converted to a biofuel component.

12. The method of claim 11 further comprising recycling the removed α-hydroxysulfonic acid to step (b) as components or in its recombined form.

13. The method of claim 1 wherein the α-hydroxysulfonic acid is present in an amount of from about 1% wt. to about 55% wt., based on the solution.

14. The method of claim 1 wherein the α-hydroxysulfonic acid is produced from (a) a carbonyl compound or a precursor to a carbonyl compound with (b) sulfur dioxide or a precursor to sulfur dioxide and (c) water.

15. The method of claim 2 wherein the α-hydroxysulfonic acid is in-situ generated.

16. The method of claim 2 wherein step (b) is carried out at a temperature within the range of about 50° C. to about 150° C. and a pressure within the range of 1 barg to about 10 barg.

17. A composition comprising (a) a microbial biomass containing at least one lipid, (b) at least one α-hydroxysulfonic acid, and (c) water.

* * * * *